Patented June 8, 1954

2,680,740

UNITED STATES PATENT OFFICE 2,680,740

PRODUCTION OF 2:4-DIAMINO-5-(4'-CHLOROPHENYL)-6-ETHYLPYRIMIDINE

Robert Michel Jacob, Ablon-sur-Seine, France, assignor to Societe des Usines Chimiques Rhone-Poulenc, Paris, France, a French body corporate No Drawing. Application June 19, 1952, Serial No. 294,485

Claims priority, application France June 23, 1951

5 Claims. (Cl. 260—256.4)

This invention relates to an improved process for the production of 2:4-diamino-5-(4'-chlorophenyl)-6-ethylpyrimidine, a compound of which the chemotherapeutic properties, and particularly the anti-malarial properties, have recently been described.

According to the present invention a process for the production of 2:4-diamino-5-(4'-chlorophenyl)-6-ethylpyrimidine comprises condensing guanidine with ethyl 2-(4'-chlorophenyl)-3-pentanone-oate in a reaction medium containing oleum of 15-40% concentration, subjecting the 2-amino-4-hydroxy-5-(4'-chlorophenyl)-6-ethylpyrimidine so obtained, or the corresponding acetylated compound to chlorination, and subjecting the 2-amino-4-chloro-5-(4'-chlorophenyl)-6-ethylpyrimidine or corresponding 2-acetylamino compound so obtained to treatment with ammonia, preferably in an organic solvent medium. The desired 2:4-diamino-5-(4'-chlorophenyl)-6-ethylpyrimidine is obtained in good yield. Where the acetylated compound is used the ammonia treatment simultaneously replaces the 4-chloro atom by an amino group and deacetylates the acetylamino group.

The course of the reaction may be illustrated as follows:

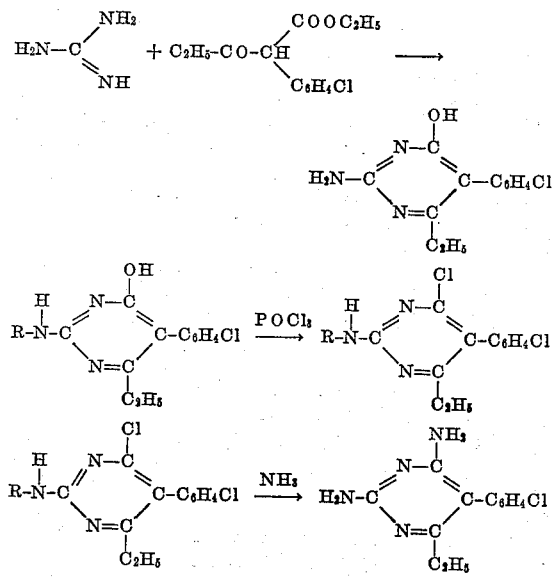

In the foregoing formulae R represents a hydrogen atom or an acetyl group.

The condensation of guanidine with ethyl 2-(4'-chlorophenyl)-3-pentanone-oate has been unsuccessfully attempted by Russell et col., Am. Soc., 73, 3763 (August 1951), who consider the condensation of the guanidine with α-phenyl β-ketone esters as impracticable. It has now been found that it can be achieved with good yields provided that the operation is carried out in oleum of a concentration of 15-40% and preferably of about 20%.

The solvent employed in the ammonia treatment is preferably chosen from among the solvents of high boiling point (at least 160°-180° C.), for example phenol, and in this case the operation is advantageously carried out at atmospheric pressure at the boiling temperature of the said solvent. However, it is possible to operate with a lower-boiling solvent, such as alcohol, under pressure.

The following examples illustrate the invention, but are not to be regarded as limiting it in any way. The melting points indicated, unless otherwise stated, were determined on the Köfler block.

*Example I*

10.8 g. of guanidine sulphate crystallised with a half-molecule of water, were slowly added to 43 cc. of 20% oleum cooled to 0° C. 24 g. of ethyl 2-(4'-chlorophenyl)-3-pentanone-oate were gradually added to the solution obtained, with cooling. The mass was allowed to warm to normal temperature and then heated for 1 hour on a water bath at 80° C. The dark-coloured solution obtained was poured on to crushed ice, and the solid product which precipitated was decanted and taken up in 200 cc. of water and 30 cc. of caustic soda (36° Bé). Crude 2-amino-4-hydroxy-5-(4'-chlorophenyl)-6-ethylpyrimidine having a melting point of 210° C. was precipitated on acidifying this solution with acetic acid. By recrystallisation from boiling ethanol the pure product having a melting point of 250° C. was obtained.

11.5 g. of this pyrimidine were heated under reflux for 1 hour with 80 cc. of phosphorus oxychloride. The excess of oxychloride was driven off by evaporation under reduced pressure and the residue was taken up with iced water. The product was neutralised with ammonia and extracted with ether. The ethereal solution was dried over sodium sulphate and then evaporated. 2-amino-4-chloro-5-(4'-chlorophenyl)-6-ethylpyrimidine having a melting point of 160° C. was thus obtained. After recrystallisation from ethyl alcohol it had a melting point of 163° C.

1.6 g. of this chlorinated pyrimidine were heated in a sealed tube with 10 cc. of ethanol saturated with ammonia for 6 hours at 130° C. On cooling, the 2:4-diamino-5-(4'-chlorophenyl) - 6 - ethylpyrimidine crystallised out in the pure state. It was filtered, washed with alcohol and dried in an oven. It had a melting point of 241° C., while its monohydrochloride had a melting point of 270° C. (determined on a Maquenne block).

The initial ethyl 2-(4'-chlorophenyl)-3-pentanone-oate (B. P.$_{0.15}$=126–130° C.) was obtained by controlled hydrolysis of the ethyl iminoester of 2-(4'-chlorophenyl) - 3 - pentanone-oic acid and the latter was in turn obtained from the nitrile of this same acid, which nitrile (M. P. 52° C.) was produced by the condensation of ethyl propionate and 4-chlorobenzyl cyanide (B. P.$_{14}$=138–139° C.)

*Example II*

55 g. of dry guanidine carbonate were dissolved in small portions in 197 cc. of 20% oleum (Nordhausen acid) while cooling at about 0° C. 78.7 g. of ethyl 2-(4'-chlorophenyl) - 3 - pentanone-oate were slowly run into the solution obtained, with stirring, the temperature being maintained at about −10° C. by a cooling bath. The cooling bath was then removed and the mass allowed to warm spontaneously to about 50° C. This temperature was maintained for 2 hours. The solution obtained was then poured into a strongly stirred mixture of 54 g. of sodium carbonate, 3.7 litres of water and 1.7 kg. of crushed ice. The lumpy precipitate which formed was filtered, washed with water, suspended in 225 cc. of methanol and neutralised by 5 cc. of ammonia (22° Bé.). The product was filtered, washed in methanol and in water and dried in an oven at 100° C. 53 g. of 2-amino-4-hydroxy-5-(4'-chlorophenyl)-6-ethylpyrimidine having a melting point of 234° C. were obtained.

50 g. of this hydroxypyrimidine were mixed with 150 cc. of anhydrous pyridine and 30.6 g. of acetic anhydride. The mixture was heated under reflux for 1½ hours, the excess of pyridine distilled off under reduced pressure and the product taken up in water and made acid to Congo red with hydrochloric acid. The precipitate obtained was filtered, washed with water and dried in an oven at 100° C. 53 g. of 2-acetylamino-4-hydroxy-5-(4'-chlorophenyl)-6-ethylpyrimidine having a melting point of 260° C. (after recrystallisation from ethyl alcohol M. P.=264° C.) were obtained.

52 g. of this acetylated derivative were introduced into 100 cc. of phosphorus oxychloride. The mixture was heated for 5 minutes at 70° C., and the excess of oxychloride then distilled off under reduced pressure. The residue was taken up in 400 g. of crushed ice and neutralised with ammonia. The product which crystallised out was filtered, washed with water and dried in vacuo. 55 g. of 2-acetylamino-4-chloro-5-(4'-chlorophenyl)-6-ethylpyrimidine having a melting point of 232° C. (after recrystallisation from ethanol M. P.=235° C.) were obtained. 50 g. of this chlorinated pyrimidine were introduced into an autoclave with 250 cc. of ethanol and 200 g. of ammonia. The mixture was heated for 6 hours at 155° C. After cooling, the product which crystallised out was filtered, washed with alcohol and dried in an oven.

34 g. of 2:4-diamino-5-(4'-chlorophenyl)-6-ethylpyrimidine having a melting point of 240° C. were thus obtained, this substance melting at 241° C. after recrystallisation from ethanol.

*Example III*

In a spherical flask provided with a reflux condenser, a mixture of 93 g. of 2-acetylamino-4-chloro-5-(4'-chlorophenyl) - 6 - ethylpyrimidine obtained as in Example 2 and 150 g. of phenol were heated at 110° C., and a current of ammonia was passed through this mixture. The temperature was maintained at 110° C. for about 5 minutes and then progressively raised for three-quarters of an hour, in such manner that the phenol was gently boiled (at about 180°–184° C.). The passage of ammonia and the heating were continued for 3 hours (about 110 g. ammonia were consumed).

The product was allowed to cool and the reaction mixture poured into 500 cc. of water and 155 cc. of caustic soda (36° Bé). The product was then agitated for ¼ hour, filtered through a Büchner funnel and washed with 150 cc. of water. The product was suspended in 150 cc. of ethanol, stirred briskly for ¼ hour, filtered, washed with 150 cc. of ethanol and dried in an oven at 100° C. to constant weight. In this way, 61 g. of 2:4-diamino-5-(4'-chlorophenyl)-6-ethylpyrimidine having a melting point of 241° C. on the Köfler block were obtained.

I claim:

1. A process for production of 2:4-diamino-5-(4' - chlorophenyl) - 6-ethylpyrimidine which comprises condensing guanidine with ethyl 2-(4'-chlorophenyl)-3-pentanone-oate in a reaction medium containing oleum of 15–40% concentration, treating with a phosphorus chloride a compound selected from the class consisting of the 2-amino-4-hydroxy-5-(4'-chlorophenyl)-6-ethylpyrimidine so obtained and the corresponding acetylated compound, and treating with ammonia a compound selected from the class consisting of the 2-amino-4-chloro-5-(4'-chlorophenyl)-6-ethylpyrimidine and the corresponding 2-acetylamino compound so obtained.

2. A process for the production of 2:4-diamino-5 - (4' - chlorophenyl) - 6 -ethylpyrimidine which comprises condensing guanidine with ethyl 2-(4'-chlorophenyl)-3-pentanone-oate in a reaction medium containing oleum of substantially 20% concentration, treating with a phosphorus chloride a compound selected from the class consisting of the 2-amino-4-hydroxy-5-(4'-chlorophenyl)-6-ethylpyrimidine so obtained and the corresponding acetylated compound, and treating with ammonia a compound selected from the class consisting of the 2-amino-4-chloro-5-(4' - chlorophenyl) - 6 - ethylpyrimidine and the corresponding 2-acetylamino compound so obtained.

3. A process for the production of 2:4-diamino-5-(4' - chlorophenyl) - 6 - ethylpyrimidine which comprises condensing guanidine with ethyl 2-(4'-chlorophenyl)-3-pentanone-oate in a reaction medium containing oleum of 15–40% concentration, treating with a phosphorus chloride a compound selected from the class consisting of the 2-amino-4-hydroxy-5-(4'-chlorophenyl)-6-ethylpyrimidine so obtained and the corresponding acetylated compound, and treating with ammonia a compound selected from the class consisting of the 2-amino-4-chloro-5-(4'-chlorophenyl)-6-ethylpyrimidine and the corresponding 2-acetylamino compound so obtained, the said treatment with ammonia being effected in an organic solvent medium.

4. A process for the production of 2:4-diamino-5-(4' - chlorophenyl) - 6 - ethylpyrimidine which comprises condensing guanidine with ethyl 2-(4'-chlorophenyl)-3-pentanone-oate in a reaction medium containing oleum of 15–40% concentration, treating with a phosphorus chloride a compound selected from the class consisting of the 2-amino-4-hydroxy-5-(4'-chlorophenyl)-6-ethylpyrimidine so obtained and the corresponding acetylated compound, and treating with ammonia a compound selected from the class consisting of the 2-amino-4-chloro-5-(4'-chlorophenyl)-6-ethylpyrimidine and the corresponding 2-acetylamino compound so obtained, the said treatment with ammonia being effected in an organic solvent medium boiling at least as high as 160° C. at the boiling temperature of said medium.

5. A process for the production of 2:4-diamino-5-(4'-chlorophenyl)-6-ethylpyrimidine which comprises condensing guanidine with ethyl 2-(4'-chlorophenyl)-3-pentanone-oate in a reaction medium containing oleum of 15-40% concentration, treating with a phosphorus chloride a compound selected from the class consisting of the 2-amino-4-hydroxy-5-(4'-chlorophenyl)-6-ethylpyrimidine so obtained and the corresponding acetylated compound, and treating with ammonia a compound selected from the class consisting of the 2-amino-4-chloro-5-(4'-chlorophenyl)-6-ethylpyrimidine and the corresponding 2-acetylamino compound so obtained, the said treatment with ammonia being effected in a medium of phenol at the boiling temperature of phenol.

References Cited in the file of this patent

UNITED STATES PATENTS

| Number | Name | Date |
|---|---|---|
| 2,579,259 | Hitchings | Dec. 8, 1951 |